United States Patent [19]
Marlier et al.

[11] Patent Number: 5,125,062
[45] Date of Patent: Jun. 23, 1992

[54] UNDERSEA TELECOMMUNICATIONS CABLE HAVING OPTICAL FIBERS

[75] Inventors: Géry Marlier, Calais; Jean-Francois Libert, Pont de Briques, both of France

[73] Assignee: Alcatel Cable, Cedex, France

[21] Appl. No.: 730,428

[22] Filed: Jul. 16, 1991

[30] Foreign Application Priority Data

Jul. 19, 1990 [FR] France .................. 90 09252
Jul. 19, 1990 [FR] France .................. 90 09251

[51] Int. Cl.⁵ ................................ G02B 6/44
[52] U.S. Cl. .................... 385/101; 174/70 R; 385/107; 385/113
[58] Field of Search ........... 350/96.23; 174/70 R, 174/70 S; 385/100, 101, 107, 109, 113

[56] References Cited

U.S. PATENT DOCUMENTS

| | | | |
|---|---|---|---|
| 4,278,883 | 7/1981 | Jackson | 174/70 R |
| 4,371,234 | 2/1983 | Parfree et al. | 350/96.23 |
| 4,460,419 | 7/1984 | Parfree et al. | 350/96.23 X |
| 4,490,009 | 12/1984 | Nakai et al. | 350/96.23 |
| 4,522,464 | 6/1985 | Thompson et al. | 350/96.23 |
| 4,523,804 | 6/1985 | Thompson | 350/96.23 |
| 4,763,981 | 8/1988 | Wilkins | 350/96.23 |
| 4,765,711 | 8/1988 | Obst | 350/96.23 |
| 4,767,182 | 8/1988 | Parfree et al. | 350/96.23 |
| 4,974,926 | 12/1990 | Blee et al. | 350/96.23 |
| 4,979,795 | 12/1990 | Mascarenhas | 350/96.23 |

FOREIGN PATENT DOCUMENTS

0203249 12/1986 European Pat. Off. .
0371660 6/1990 European Pat. Off. .

OTHER PUBLICATIONS

Siemens Telecom Report, vol. 10, No. 5, Sep.-Oct., 1987, pp. 279-280, Eriangen, Germany; H. Gotschy: "Nachrichtenubertragung mti Licht-auch unter Wasser".

Primary Examiner—John D. Lee
Attorney, Agent, or Firm—Sughrue, Mion, Zinn, Macpeak & Seas

[57] ABSTRACT

The undersea cable has optical fiber embedded in material filling a tube which itself lies inside a helical lay of metal wires having high mechanical strength, the interstices between the wires of the helical lay being filled with a sealing material. The helical lay is surrounded by an extruded sheath made of an electrically insulating and abrasion resistant material, and for the purposes of remotely powering equipment interposed on the cable, the cable includes conductive means either belonging to the helical lay or surrounding it, said conductor means being surrounded by said sheath.

11 Claims, 3 Drawing Sheets

UNDERSEA TELECOMMUNICATIONS CABLE HAVING OPTICAL FIBERS

The present invention relates to an undersea telecommunications cable having optical fibers, the cable comprising a tube containing the optical fibers embedded in a filler material, the tube being disposed inside a helical lay of metal wires having high mechanical strength.

BACKGROUND OF THE INVENTION

Proposals have already been made in Document AU-A-81304/87 for an undersea telecommunications cable including a conductive metal tube surrounding optical fibers embedded in a material that fills the inside of the tube, electrical insulation surrounding the tube which is made of a conductive metal, and at least one layer of metal wires having high traction strength surrounding the installation and constituting protective armoring. However, such a cable does not provide adequate resistance to the possibility of water infiltrating and propagating longitudinally, particularly in the event of an immersed cable being damaged. Further, the metal wires constituting the protective armoring may be corroded on contact with seawater, e.g. by bacterial action, and this corrosion phenomenon may then give rise to molecular hydrogen being evolved which, under certain conditions, can migrate until it comes into contact with the optical fibers where it gives rise to degraded transmission characteristics. In addition, the conductive metal tube containing the optical fibers makes the structure of the tube expensive for a connection that is not remotely powered, or else it requires a different optical module (i.e. the tube containing the fibers) to be used depending on whether or not the link is remotely powered.

Document EP-A-O 371 660 describes an undersea telecommunications cable having optical fibers in a strength tube, which tube is not used for transporting energy, thereby making it possible to leave the central portion of the cable unaltered regardless of whether the cable is used for remotely powering repeaters or regenerators on a given link. That cable includes a dielectric covering the tube, strength armoring on the dielectric, and an outer protective sheath. Where appropriate, that cable is provided with an internal remote-powering conductive layer constituted by a layer of conductor wires made of copper or aluminum and interposed in the dielectric. The dielectric is then made up from two layers, and the remote-power conductors are sandwiched between these two dielectric layers.

An object of the present invention is to satisfy the same object but with a structure that is more compact and easier to implement, and which is cheaper, which structure also serves to minimize or eliminate electric field concentrations that may cause it to be damaged.

SUMMARY OF THE INVENTION

The present invention provides an underwater telecommunications cable having optical fibers, the cable comprising a tube providing mechanical strength to the cable and protection to the optical fibers, the tube containing the optical fibers embedded in a filler material, a helical lay of metal wires having high mechanical strength around the tube co-operating with the tube to confer mechanical pressure and traction withstanding characteristics on said cable, a sealing material in the interstices between the wires of high mechanical strength of the helical lay opposing the propagation of water along the cable, an outer extruded sheath of abrasion resistant material surrounding said helical lay, and internal conductor means for remotely powering equipment interposed on the cable, wherein said conductor means are disposed at the periphery of said helical lay and are surrounded by said outer extruded sheath and are of a cross-sectional area adapted to the requirements of said equipment, said outer sheath also being electrically insulating.

The cable preferably satisfies at least one of the following features:

the said remote-power conductor means are constituted by a conductive strip on the helical lay or by conductor wires belonging to the helical lay together with said metal wires having high mechanical strength;

it includes a semiconducting interface layer between the remote power means and said outer sheath, the interface layer being made of an insulating material filled with conductive particles; and the sealing material is itself filled with conductive particles.

BRIEF DESCRIPTION OF THE DRAWINGS

Embodiments of the invention are described by way of example with reference to the accompanying drawings, in which.

DETAILED DESCRIPTION

In these figures, the same references are used for designating the same items.

Figure 1:
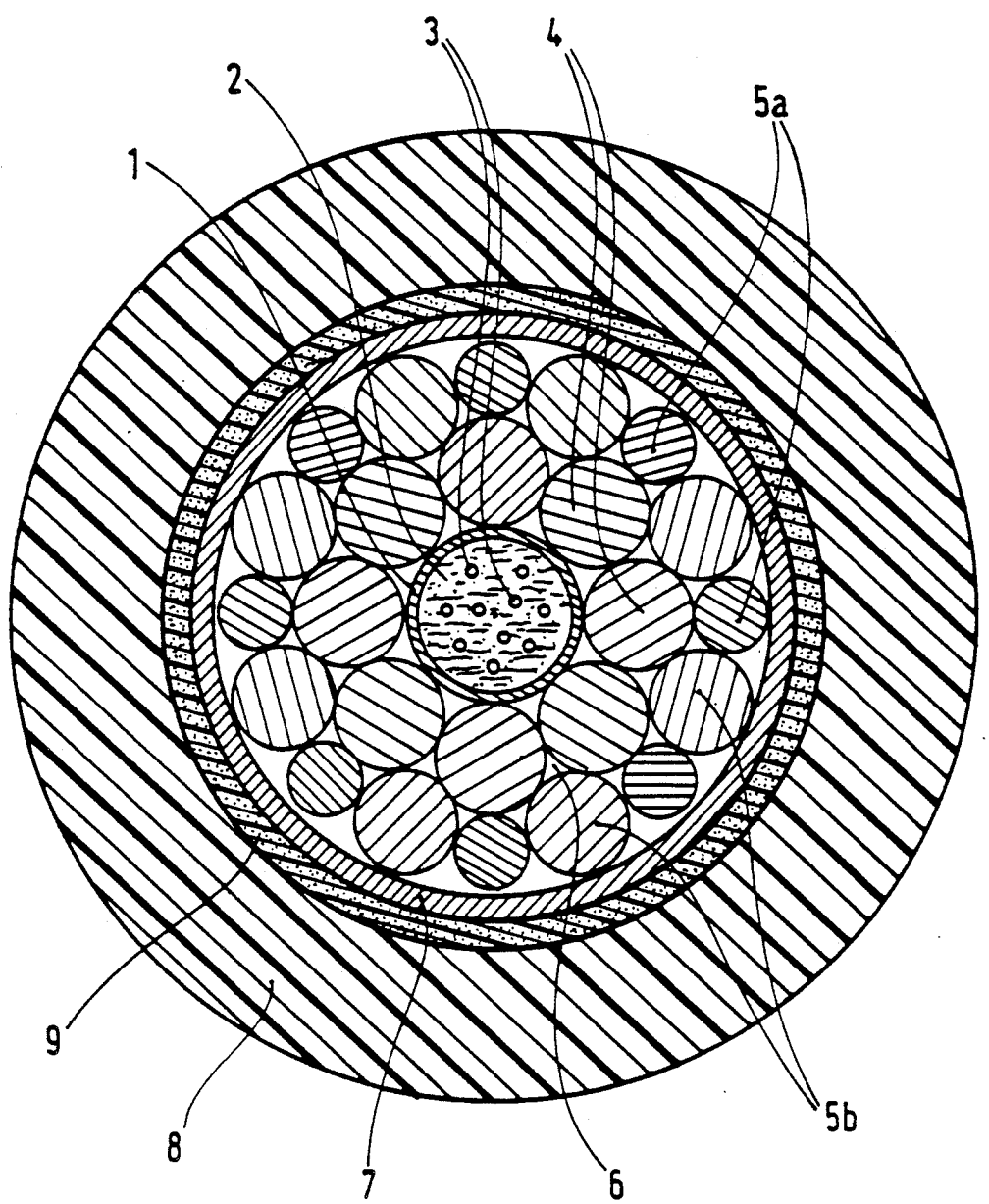
FIG. 1 is a section through a cable of the invention.

The cable shown in FIG. 1 comprises a tube 1 filled with a sealing compound, e.g. a silica gel 2, having optical fibers 3 embedded therein. The fibers may optionally be in a helical lay, and their length may optionally be greater than that of the tube.

The tube 1 withstands water pressure and is made of metal, e.g. steel. It is longitudinally welded by laser or by arc-welding under inert gas, or by plasma arc, or by any other appropriate method. The tube 1 may also be made of extruded plastic, in which case means are associated therewith as described below for conferring adequate pressure resistance to the cable.

The tube 1 is surrounded by a helical lay of metal wires 4, 5a, and 5b having high traction strength, occupying one or preferably more layers and laid in the same direction or in opposite directions. When the tube 1 is made of plastic, this helical lay also presents the characteristics of an arch for withstanding pressure. In particular the wires 4 and 5a are preferably made of steel.

The interstices 6 between the wires 4 and 5 and between the helical lay and the tube 1 are filled with a sealing material (not shown to avoid overcrowding) which opposes longitudinal propagation of water along the cable, in particular in the event of an immersed cable being accidentally damaged. This sealing material may be a polyurethane resin, for example, or any other material capable of performing this sealing function.

The cable of FIG. 1 also includes a conductive strip 7 made of copper or of aluminum or of any other metal or alloy that is a very good conductor of electricity, with the strip being disposed around the lay of wires having high mechanical strength. The conductive strip 7 is used for remotely powering regenerators or amplifying repeaters interposed between lengths of cable in an undersea link. It brings the generally too high value of the electrical resistance presented by the helical lay of steel wires and by the steel tube down to an appropriate value. The conductive strip 7 is welded longitudinally to constitute a tube and it is swaged onto the helical lay or it is defined by one or more helically-wound tapes, or by one or more foils placed along the helical lay and assembled together.

A sheath 8 of polyethylene or any other material that is electrically insulating and abrasion resistant is extruded in one or more layers over the helical lay covered in its conductive strip 7. The thickness of the sheath 8 is a function of the desired degree of electrical insulation and of mechanical protection.

Advantageously, as illustrated, a semiconducting interface layer 9 is interposed between the sheath 8 and the conductive strip 7, in particular when the strip is taped or is otherwise not perfectly smooth. This layer has very low conductivity. It constitutes a potential barrier enabling electrical charge to be uniformly distributed in the strip 7 and it enables the thickness of the sheath 8 to be reduced for a given amount of insulation by avoiding intense electric field concentrations on sharp points which could otherwise damage the sheath 8. The semiconducting layer is made of polyethylene filled with conductive particles, e.g. carbon particles. A keying agent, e.g. a copolymer, serves where necessary to provide adhesion on the conductive strip 7.

In addition, the sealing material may itself be filled with conductive particles and/or another semiconducting layer (not shown but analogous to the layer 9) may be used to cover the outer interstices between the wires of the helical lay, together with a keying agent to ensure adhesion on the peripheral wires 5 of the helical lay and on the conductive strip 7, thereby avoiding any electrical problems at the interface between the conductive strip and the helical lay.

Figure 2:
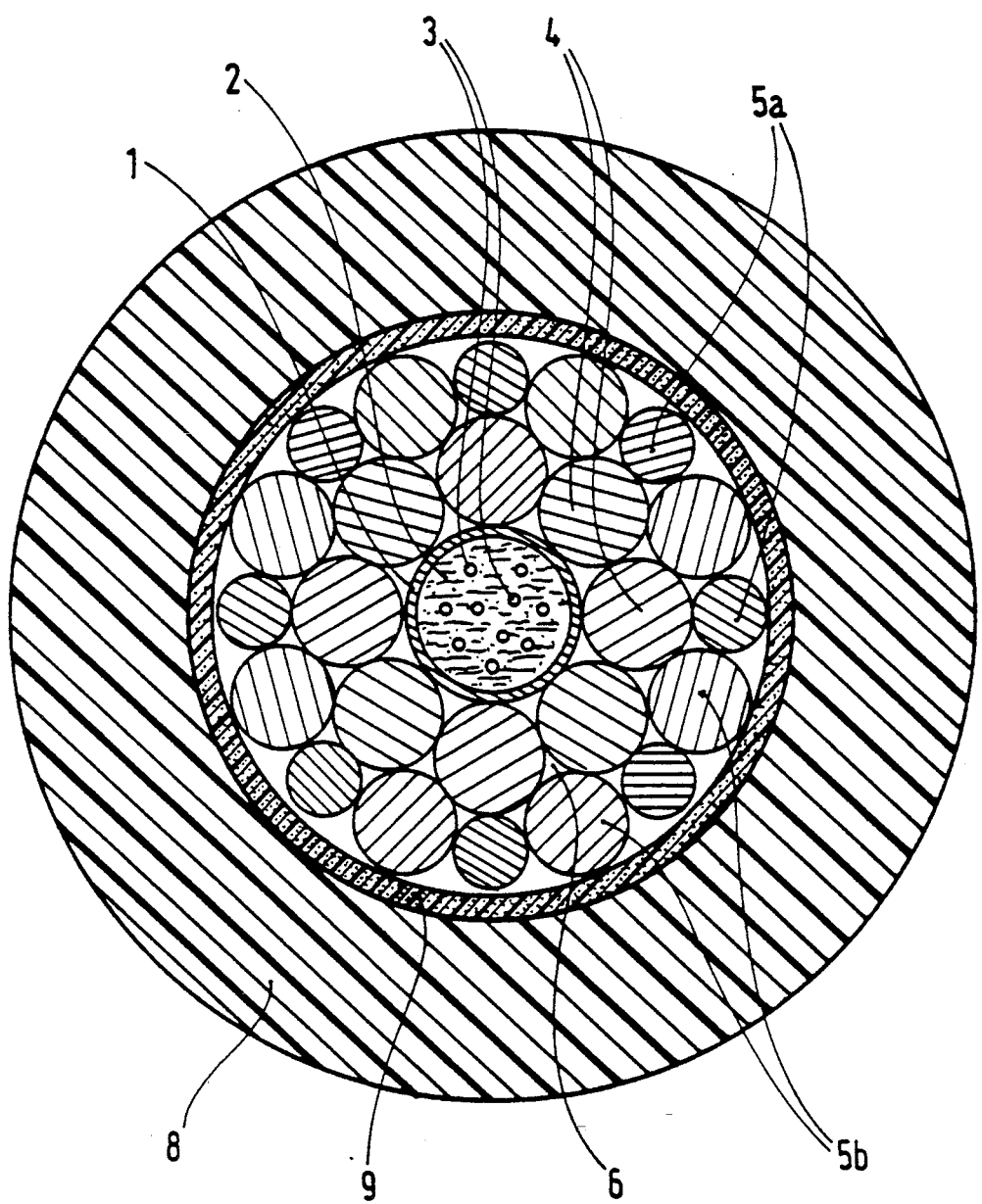
FIG. 2 is a section through a variant embodiment of a cable of the invention.

The cable shown in FIG. 2 is a variant of the above cable. Only its differences compared with the cable of FIG. 1 are described below.

The cable of FIG. 2 does not have the conductive strip 7 of the cable of FIG. 1. It has its semiconducting layer 9 disposed directly against the helical lay of wires and it adheres to the peripheral wires. In addition its helical lay is made up of wires 4, 5a, and 5b which are preferably in a plurality of layers and some of which are not wires having high mechanical strength but are conductor wires. It is preferably made of steel wires 4 occupying one or more layers against the tube 1 and presenting arch characteristics when the tube 1 is made of plastic, with the wires 5a and 5b in the outer layer comprising steel wires and wires of aluminum or of copper. These outer wires 5a and 5b are shown as being different in section and as alternating. Which of the wires 5a and 5b are the conductor wires depends on the wire diameter that gives the appropriate electrical resistance for remotely powering repeaters or regenerators. These wires act as the above-mentioned strip 7.

Figure 3:
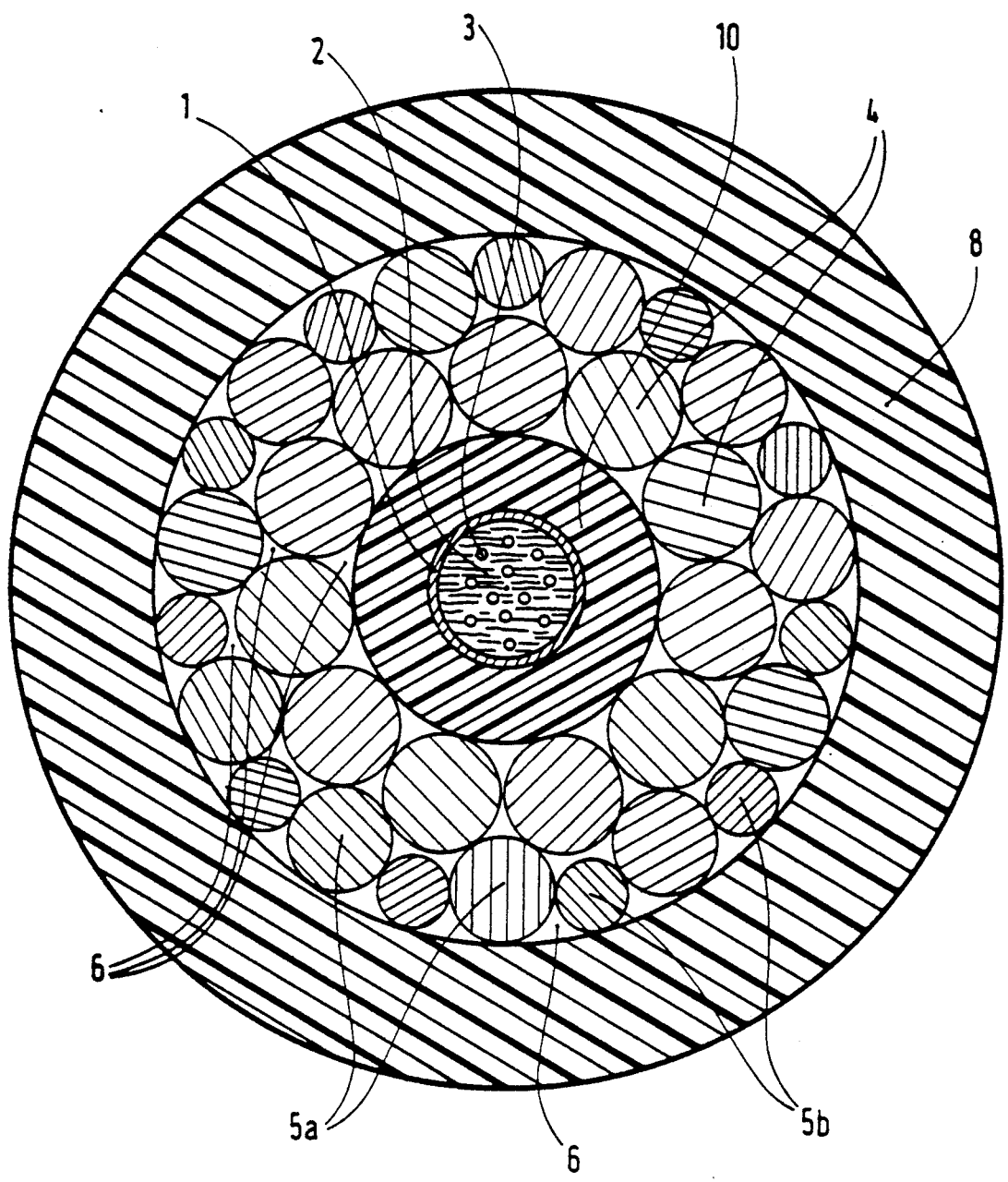
FIG. 3 is a section through another variant embodiment of the cable of the invention.

The cable shown n FIG. 3 is a variant of the above cables. It has its layer of sealing material filling the interstices 6 between the wires of the helical lay, and in particular the outer interstices between the wires 5a and 5b filled with conductive particles and optionally with a keying agent on which the outer sheath 8 adheres directly. This outer layer of sealing material performs the role of the above-mentioned layer 9 directly.

The cable of FIG. 3 also includes an internal sheath 10 interposed between the tube 1 and the armoring of wires 4 and 5. It imparts a larger diameter to the cable an makes it possible to improve its mechanical characteristics when the cable is to be used at great depths.

Cables with or without remote powering have the same central module defined by the tube 1 containing the fibers and on which appropriate outer components are applied. A cable without remote powering has its helical lay of wires that are all made of steel and it is filled with sealing material without a conductive strip and/or a semiconducting layer. A cable with remote power supply has its helical lay of wires all made of steel filled with sealing material and receiving the conductive strip on which the semiconducting layer is preferably formed to constitute an interface with the sheath, and optionally an interface with the helical lay, or else its helical lay is made both of steel wires and of conductor wires and is filled with sealing material and preferably receives the semiconducting layer to provide an interface with the sheath. The manufacturing costs of both types of cable (for a link that is remotely powered or otherwise) is thus reduced. Cable structure is compact and lighter in weight, and withstands pressure well.

With reference to the various cables described above, it appears that the existence, the nature, and the cross-sectional areas of the conductor means may be modified to satisfy the remote powering requirements of the system without it being necessary to act on the other component parts of the cable. The cross-section of said conductor means may, in particular, be zero for systems that do not have repeaters, may be small for systems having optical amplifiers, or normal for systems having regenerators. This has no effect on the resistance of the cable to hydrogen or to pressure.

We claim:

1. An underwater telecommunications cable having optical fibers, the cable comprising a tube providing mechanical strength to the cable and protection to the optical fibers, the tube containing the optical fibers embedded in a filler material, a helical lay of metal wires having high mechanical strength around the tube and acting with the tube to withstand mechanical pressure and traction on said cable, a sealing material in the interstices between the wires of high mechanical strength of the helical lay opposing the propagation of water along the cable in the event the immersed cable becomes damaged, an outer extruded sheath of abrasion resistant material surrounding said helical lay, and internal conductor means for remotely powering equipment interposed on the cable, said conductor means being disposed at the periphery of said helical lay and being surrounded by said outer extruded sheath and being of a cross-sectional area meeting the requirements of said equipment, said outer sheath also being electrically insulating and wherein said conductor means for remote power supply purposes include a conductive strip welded longitudinally and swaged onto the helical lay, or helically taped thereabout, or placed therealong.

2. A cable according to claim 1, further including an extruded inner sheath between said helical lay and the tube containing the fibers.

3. A cable according to claim 1, further including a semiconducting interface layer between said conductor means for remote power supply purposes and said outer extruded sheath, said semiconducting interface layer constituting a potential barrier enabling an electrical charge to be uniformly distributed in the conductive strip while permitting the outer sheath to be of reduced thickness for a given amount of insulation by avoiding intense electrical field concentration on sharp points which could otherwise damage said outer sheath.

4. A cable according to claim 3, wherein the semiconducting layer is made of a polyethylene resin filled with conductive particles.

5. A cable according to claim 3, further including another semiconducting layer filling the outer interstices between the peripheral wires of the helical lay and adhering to said peripheral wires.

6. A cable according to claim 5, wherein the semiconducting layer is made of a polyethylene resin filled with conductive particles.

7. A cable according to claim 1, wherein said sealing material is filled with conductive particles.

8. A cable according to claim 7, wherein said sealing material is a polyurethane resin.

9. A cable according to claim 1, wherein said tube is made of metal and withstands pressure.

10. A cable according to claim 1, wherein said tube is made of plastic, and wherein said helical lay of metal wires having high mechanical strength constitutes an arch for the plastic tube.

11. An underwater telecommunications cable having optical fibers, the cable comprising a tube providing mechanical strength to the cable and protection to the optical fibers, the tube containing the optical fibers embedded in a filler material, a helical lay of metal wires having high mechanical strength around the tube and acting with the tube to withstand mechanical pressure and traction on said cable, a sealing material in the interstices between the wires of high mechanical strength of the helical lay opposing the propagation of water along the cable in the event the immersed cable becomes damaged, an outer extruded sheath of abrasion resistant material surrounding said helical lay, and internal conductor means for remotely powering equipment interposed on the cable, said conductor means being disposed at the periphery of said helical lay and being surrounded by said outer extruded sheath and being of a cross-sectional area meeting the requirements of said equipment, said outer sheath also being electrically insulating, and wherein said conductor means for remote power supply purposes include wires of high electrical conductivity forming part of said helical lay together with said metal wires having high mechanical strength, and wherein said helical lay comprises at least an inner first layer of said wires all made of metal having high mechanical strength and a peripheral layer of wires including a plurality of said wires of metal having high mechanical strength and a plurality of said wires of high electrical conductivity.

* * * * *